United States Patent
Horne et al.

(10) Patent No.: US 12,510,124 B2
(45) Date of Patent: Dec. 30, 2025

(54) SEALED CONSTANT VELOCITY JOINT

(71) Applicant: Neapco Intellectual Property Holdings, LLC, Livonia, MI (US)

(72) Inventors: Aaron Horne, Lathrup Village, MI (US); Riki Patel, Royal Oak, MI (US)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 440 days.

(21) Appl. No.: 18/086,753

(22) Filed: Dec. 22, 2022

(65) Prior Publication Data

US 2024/0209901 A1 Jun. 27, 2024

(51) Int. Cl.
*F16D 3/84* (2006.01)
*F16D 3/223* (2011.01)

(52) U.S. Cl.
CPC .... *F16D 3/845* (2013.01); *F16D 2003/22316* (2013.01); *Y10S 464/906* (2013.01)

(58) Field of Classification Search
CPC ........... F16D 3/845; F16D 2003/22316; Y10S 464/906
USPC ................................................. 464/173, 175
See application file for complete search history.

(56) References Cited

U.S. PATENT DOCUMENTS

| | | | |
|---|---|---|---|
| 2,510,362 A * | 6/1950 | Anderson | F16J 15/52 464/175 |
| 5,230,660 A * | 7/1993 | Warnke | F16D 3/845 464/173 |
| 7,204,760 B2 | 4/2007 | Wang | |
| 7,677,981 B2 | 3/2010 | Zierz et al. | |
| 7,736,239 B2 | 6/2010 | Niederhufner et al. | |
| 7,972,218 B2 * | 7/2011 | Disser | F16D 3/224 464/173 |
| 10,352,370 B2 * | 7/2019 | Miller | F16D 3/227 |

FOREIGN PATENT DOCUMENTS

AU 207046 * 7/1955 ............. 464/175
WO 2012003261 A2 1/2012

* cited by examiner

*Primary Examiner* — Greg Binda
(74) *Attorney, Agent, or Firm* — Dickinson Wright PLLC

(57) ABSTRACT

A constant velocity joint includes a first shaft extending along an axis and rotatable about the axis. An outer race is connected to and rotatable with the first shaft. The outer race defines a compartment. A rotatable second shaft terminates at an inner race in the compartment. The inner race is rotatable with the outer race and is pivotably connected to the outer race such that the inner race and second shaft are pivotable relative to the outer race. A boot comprised of a flexible material has an upper region connected to the outer race and a lower region connected to the second shaft. A can overlies the boot and includes a shaping region for maintaining a shape of the boot along at least a portion of the boot as the boot expands. The can and boot permit the joint to be fully sealed with optimized performance.

17 Claims, 3 Drawing Sheets

SEALED CONSTANT VELOCITY JOINT

FIELD

The present disclosure generally relates to a constant velocity joint, such as that used in a vehicle driveline. More particularly, the present disclosure relates to a constant velocity joint that is sealed to prevent contaminants from entering a compartment of the constant velocity joint.

BACKGROUND

This section of the written disclosure provides background information related to constant velocity joints and is not necessarily prior art to the inventive concepts disclosed and claimed in this application.

Constant velocity ("CV") joints are typically used in the drivelines of vehicles, such as automobiles, to provide a transfer of power at a constant rotational speed and at variable angles. Due to its location at a bottom of the vehicle, the driveline (including the CV joints) may be exposed to water and/or other debris. For example, it is not uncommon for the driveline to be exposed to water, either as a result of the automobile driving through standing water puddles or even deeper water, such as fording a stream. The CV joint may include a number of internal components, and in between those components air is trapped by a seal that prevents external contaminants from contacting the internal components. The air inside of the CV joint may become heated during operation of the CV joint, especially as the driveline rotates at high speeds. The heated air causes a pressure increase in relation to the outside (i.e., ambient) air. The CV joint typically includes a flexible boot seal to accommodate such pressure increases. However, an issue with such configurations is excessive pressure in the CV joint can lead to excessive ballooning of the boot which can cause instabilities and associated decreased performance of the CV joint, and/or boot ruptures which permit contaminants to enter the CV joint.

To combat such excessive ballooning, it is common to include a vent assembly as part of the CV joint in order to relieve pressure in the CV joint in a controlled manner while still protecting the CV joint from water and/or debris intrusion. An example of a seal and vent assembly for a CV joint is disclosed in U.S. Pat. No. 7,204,760 to Wang et al. An issue with such vent and seal assemblies is that venting channels can be difficult to form or mold with precision on a flexible body of the vent valve. Furthermore, due to the relatively small size of the body of the vent valve, a limited number of venting channels may be formed therein, and the size of such venting channels is limited. Smaller and fewer venting channels can create a high risk of the venting channels becoming plugged with grease from within the CV joint, or contaminants from outside of the CV joint.

On the other hand, U.S. Pat. No. 7,736,239 discloses an example of a sealed CV joint. The CV joint includes a first shaft that extends along a first axis and is rotatable about the first axis. An outer race is connected to and is rotatable with the first shaft. The outer race defines a compartment, and a rotatable second shaft and associated inner race are disposed in the compartment. The inner race is rotatable with the outer race and is pivotally connected to the outer race such that the inner race and second shaft are pivotable relative to the outer race. A boot extends in a substantially vertical/radial direction between the outer race and the second shaft to provide some degree of expansion to accommodate pressure increases in the CV joint. However, in order to prevent excessive ballooning, the boot is comprised of a stiff, non-resilient elastomer material such as a thermoplastic elastomer to provide resistance to high pressure ballooning. The stiff material of the boot provides low flexibility and fatigue performance which inhibits the CV joint from withstanding high joint operating angles for extended periods of time.

In view of the foregoing, there remains a need for improvements to CV joint assemblies.

SUMMARY

This section provides a general summary of the inventive concepts associated with this disclosure and is not intended to be interpreted as a complete and comprehensive listing of all of its aspects, objectives, features and advantages.

According to an aspect of the disclosure, a constant velocity joint includes a first shaft that extends along a first axis and is rotatable about the first axis. An outer race is connected to and rotatable with the first shaft. The outer race defines a compartment. The constant velocity joint also includes a rotatable second shaft. An inner race is connected to the second shaft in the compartment of the outer race. The inner race is rotatable with the outer race and is pivotally connected to the outer race such that the inner race and second shaft are pivotable relative to the outer race and configured to rotate at a same speed as the outer race. A boot comprised of a flexible material has an upper region connected to the outer race and a lower region connected to the second shaft. The boot is configured to seal the region between the outer race and the second shaft. A can overlies the boot and includes a shaping region for maintaining a shape of the boot along at least a portion of the boot as the boot expands and engages an inner surface of the can.

The subject constant velocity joint solves the aforementioned clogging, grease loss and contamination issues associated with vented constant velocity joints by sealing the compartment with the boot. Additionally, the subject constant velocity joint overcomes the performance issues associated with prior sealed constant velocity joints by employing a flexible material of the boot which provides sufficient expansion while also providing shape control of the boot during expansion with the can which overlies the flexible boot. Indeed, the can of the subject constant velocity joint allows the boot to be made of flexible materials (e.g., a shore hardness in the range of Shore 55A to Shore 65A). This provides consistent performance of the boot at higher operating angles without risk of rupturing of the boot or the entrance of contaminants in the constant velocity joint.

DRAWINGS

The drawings described herein are for illustrative purposes only of selected embodiments and not all possible implementations, and are not intended to limit the scope of the present disclosure.

DETAILED DESCRIPTION

Figure 1:
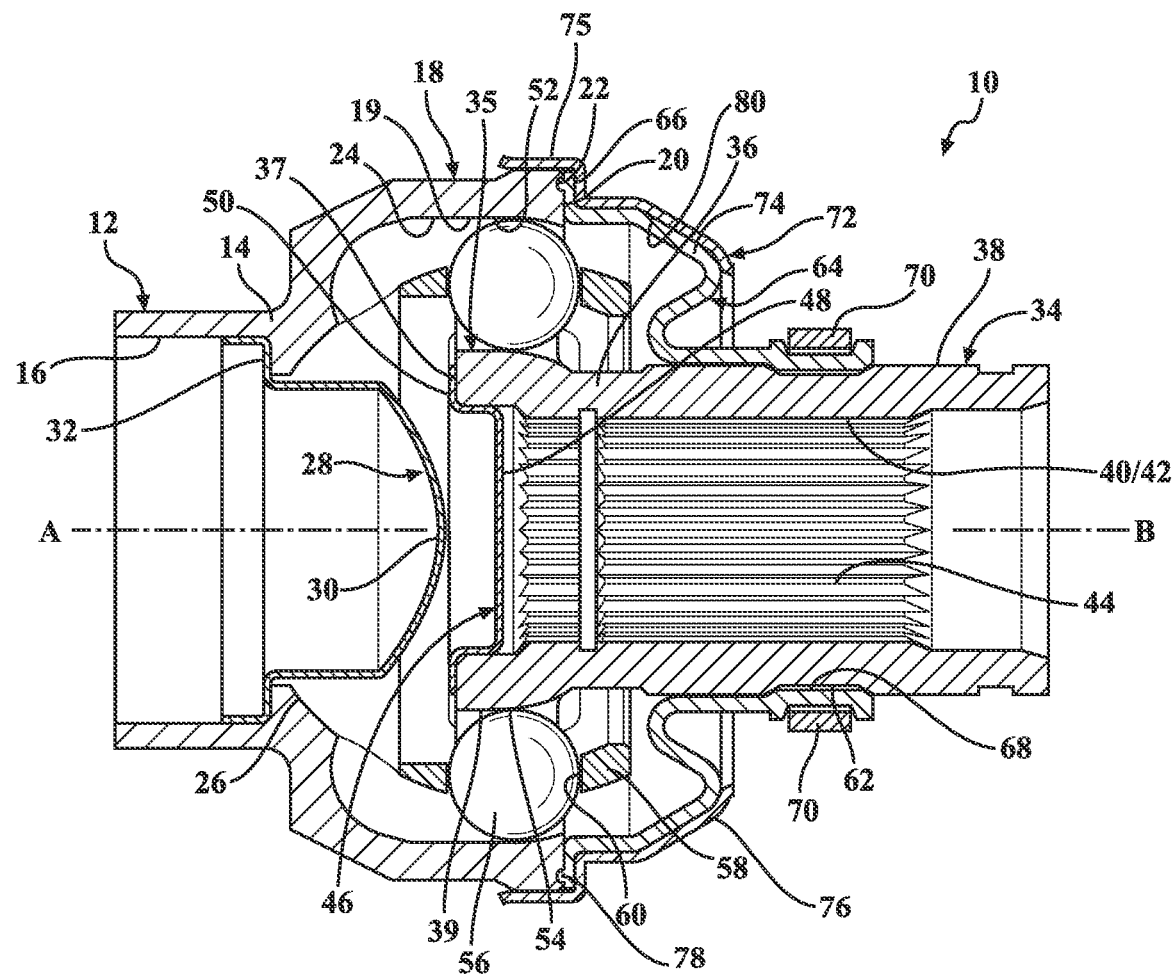
FIG. 1 is a side cross-sectional view of a constant velocity joint according to an aspect of the present disclosure.
Figure 2:
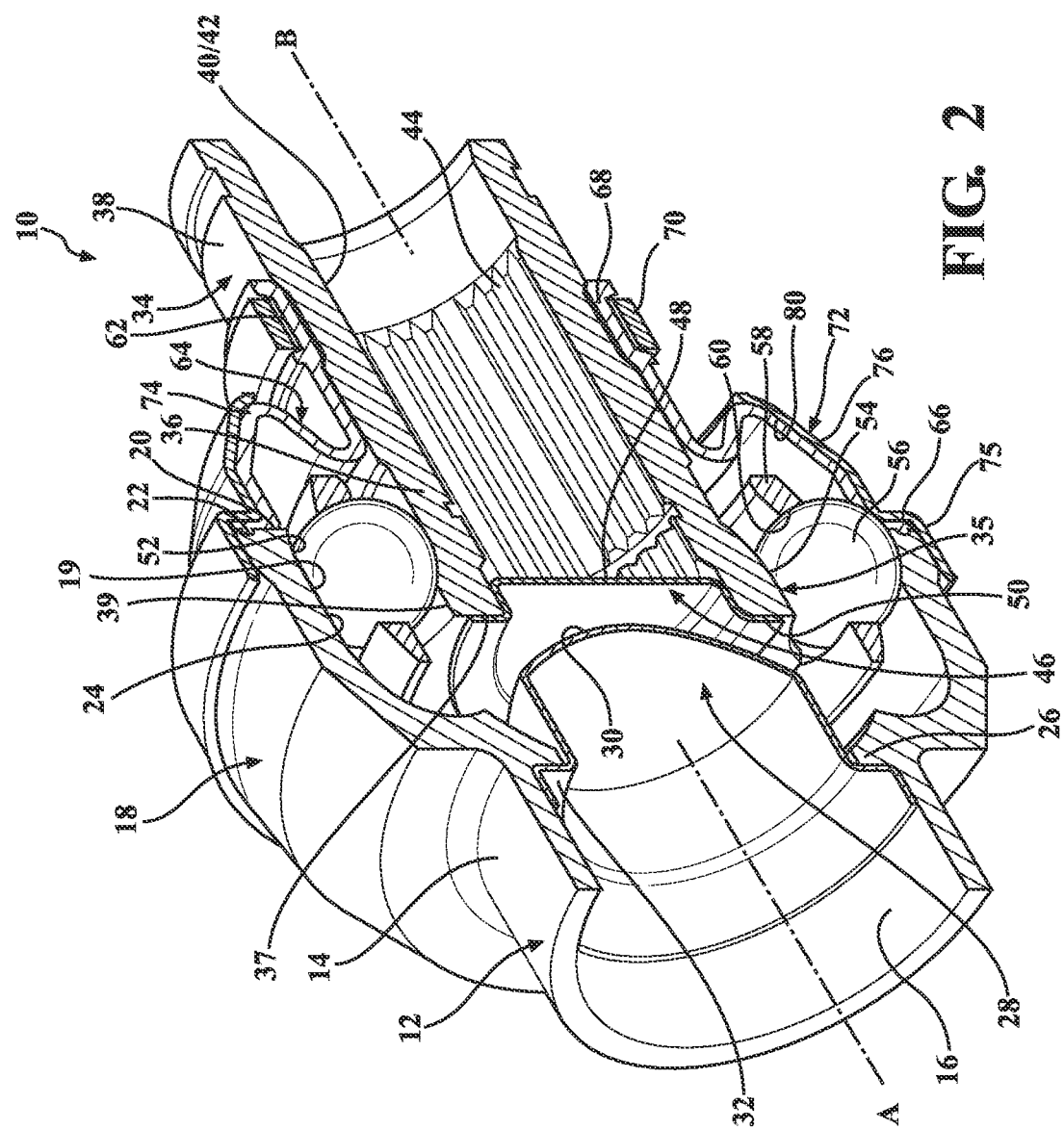
FIG. 2 is a perspective cross-sectional view of the constant velocity joint.
Figure 3:
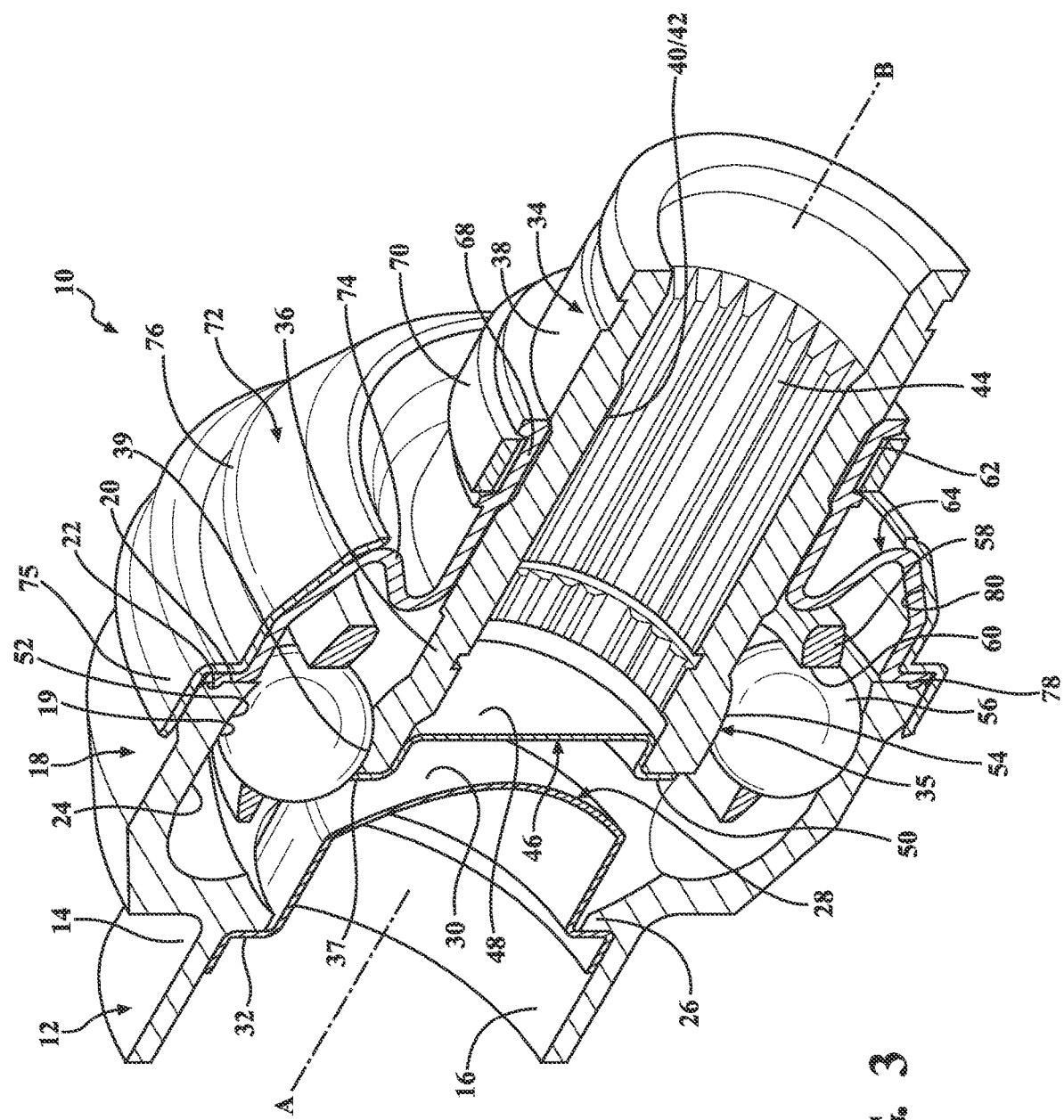
FIG. 3 is a further perspective cross-sectional view of the constant velocity joint.

Referring to the figures, wherein like numerals indicate corresponding parts throughout the several views, a constant velocity joint 10 is generally shown. The subject constant velocity joint may be used on the drivelines of various vehicles such as automobiles, off-road vehicles or recreational vehicles.

The constant velocity joint 10 includes a first shaft 12 that extends about and along a first axis A and terminates at a distal region 14. The first shaft 12 defines a first hollow 16 along the first axis A.

An outer race 18 is connected to the distal region 14 of the first shaft 12. The outer race 18 extends about the first axis A and has a generally arc-shaped cross section as the outer race 18 extends axially and radially outwardly from the first shaft 12. The outer race 18 terminates at an end face 20 which is substantially planar and extends along a plane that is substantially perpendicular to the first axis A. The end face 20 defines a notch 22 that extends axially therein. The outer race 18 presents an inner circumference 19 that partially defines a compartment 24 of the constant velocity joint 10. The outer race 18 also presents an inner flange 26 that extends annularly and radially inwardly from the inner circumference 19 of the outer race 18 at a location adjacent to the distal region 14 of the first shaft 12.

A first seal 28 is positioned in the hollow 16 of the first shaft 12 and is configured to further define a boundary of the compartment 24. More particularly, the first seal 28 sealingly separates the first hollow 16 from the compartment 24. The first seal 28 has a cap portion 30 that extends axially toward the compartment 24, and an elbow portion 32 that axially engages the front flange 26 and radially engages an inside surface of the first shaft 12 in the first hollow 16.

A second shaft 34 extends along a second axis B to a terminal region 36 which is located in the compartment 24. An inner race 35 is connected to the terminal region 36 of the second shaft 34 and terminates axially at a terminal face 37. The inner race 35 is pivotable relative to the outer race 18 such that the second shaft 34 is also pivotable relative to the outer race 18 and the first shaft 12. The inner race 35 presents an outer circumference 39. The second shaft 34 is configured to receive power/rotational movement from the first shaft 12 while permitting pivoting of the second shaft 34 relative to the first shaft 12 via the arrangement of the outer and inner races 18, 35 (discussed in further detail below).

The second shaft 34 presents an outer surface 38 and an inner surface 40 opposite the outer surface 38. The second shaft 34 defines a second hollow 42 that extends along the second axis B through the second shaft 34 and the inner race 35. The inner surface 40 of the second shaft 34 defines a plurality of internal splines 44 that are configured to interleave with a plurality of external splines of another shaft (not shown) to provide relative axial movement between the two shafts while transmitting power/rotational movement between the two shafts.

A second seal 46 is positioned at the terminal face 37 of the inner race 35 and is configured to further define a boundary of the compartment 24. More particularly, the second seal 46 sealingly separates the compartment 24 from the second hollow 42 of the second shaft 34. The second seal 46 has a cap portion 48 that is received in, and spans across the second hollow 42 and engages the inner surface 40 of the second shaft 34, and a rim portion 50 that extends radially outwardly from the cap portion 48 and engages the terminal face 37 of the inner race 35.

The inner circumference 19 of the outer race 18 defines a plurality of first channels 52 positioned in circumferentially spaced relationship with one another around the inner circumference 19 of the outer race 18 adjacent to the end face 20 of the outer race 18. Likewise, the outer circumference 39 of the inner race 35 defines a plurality of second channels 54 in circumferential alignment with the first channels 52 of the outer race 18. A plurality of balls 56 are positioned radially between the outer and inner races 18, 35 in the first and second channels 52, 54 for guiding the pivoting movement of the inner race 18 relative to the outer race 35 while transmitting power/rotational movement from the outer race 18 to the inner race 35 or vice versa. A cage 58 is positioned in the compartment of the outer race 18 radially between the outer and inner races 18, 35. The cage 58 defines a plurality of ball openings 60 each receiving one of the balls 56 for maintaining the balls 56 in their positions in the first and second channels 52, 54.

The outer surface 38 of the second shaft 34 defines an annular slot 62 that extends radially inwardly in axially spaced relationship from the terminal region 36 of the second shaft 34. A boot 64 of a flexible material extends from an outer portion 66 overlying the end face 20 of the outer race 18 to an inner portion 68 overlying the slot 62 of the second shaft 34. The outer portion 66 of the boot 64 presents a protrusion 78 that extends axially into the notch 22 of the end face 20 to align the outer portion 66 of the boot 64 and aid in sealing the boot 64 to the end face 20. Together, the outer and inner races 18, 35, the first and second seals 28, 46, the boot 64 and the second shaft 34 define the boundaries of the compartment 24 and completely seal the compartment 24. A clamp 70 is positioned about the inner portion 68 of the boot 64 in axial alignment with the slot 62 of the second shaft 34. The clamp 70 connects the boot 64 to the second shaft 34 along the slot 62 to further seal the compartment 24. The boot 64 is comprised of a flexible material that preferably has a shore hardness of between approximately Shore 55A and Shore 65A. Importantly, this permits the boot 64 to sufficiently flex to accommodate a pressure increase in the compartment 24 due to increases in temperature of air in the compartment 24 such as during high rotational speeds of the constant velocity joint 10. As illustrated, a central portion of the boot 64 defines two or more bends which result in a zig-zag shape which accommodates high angle articulation while limiting a level of strain or stretch in the sealed regions of the boot 64 that could otherwise cause fatigue cracks to initiate.

A can 72 comprised of a stiff material is disposed annularly about the boot 64 along the outer portion 66 of the boot 64. The can 72, first seal 28 and second seal 46 may all be made of a stamped low carbon steel (SAE 1008-1010) with a zinc-rich plating for corrosion protection. The can 72 has a fastening portion 75 that crimps the outer portion 66 of the boot 64 to the outer race 18, and a shaping portion 76 that has a cross-sectional shape that extends axially from the fastening portion 75 and radially inwardly toward a central region 74 of the boot 64. The can 72 is configured to maintain an arc-shape of the boot 64 adjacent to the outer portion 66 as the boot 64 engages an inner surface 80 of the can 72. The can 72 overlies a large portion of the boot 64, which contributes to maintaining the shape of the boot 64 during expansion. The length of the can is designed to allow minimum joint angular movement and control boot 64 stability at high RPMs. The inward arc shape (conical slope) of the zig-zag shape in the radial outer region of the boot 64 is useful for limiting a radial height of the region of the boot 64 that is not supported to resist ballooning and deformation when the compartment 24 is pressurized.

The subject constant velocity joint 10 overcomes the performance issues associated with prior sealed constant velocity joints by employing a flexible material of the boot 64 which provides sufficient expansion while also providing shape control of the boot 64 during expansion with the can 72 which overlies the flexible boot 64. Indeed, the can 72 of the subject constant velocity joint 10 allows the boot 64 to be made of flexible materials (e.g., a shore hardness in the range of Shore 55A to Shore 65A). This provides consistent performance of the boot 64 without a risk of rupturing of the boot 64 or the entrance of contaminants in the constant velocity joint 10. Furthermore, the subject constant velocity joint 10 does not require an o-ring seal to be located between the boot 64 and the outer race 18 due to the arrangement of the protrusion 78 of the boot 64 in the notch 22 of the outer race 18 and the arrangements of the clamp 70 and can 72 sealing the boot 64 at its outer and inner portions 66, 68.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A constant velocity joint, comprising:
   a first shaft extending along and rotatable about a first axis;
   an outer race connected to and rotatable with the first shaft and defining a compartment;
   a second shaft being rotatable;
   an inner race connected to the second shaft in the compartment, the inner race rotatable with the outer race and pivotably connected to the outer race such that the inner race and second shaft are pivotable relative to the outer race;
   a boot comprised of a flexible material and having an outer region connected to the outer race and an inner region connected to the second shaft and configured to seal the region between the outer race and the second shaft;
   a can overlying the boot for maintaining a shape of the boot along at least a portion of the boot as the boot expands and engages an inner surface of the can;
   the can having a fastening portion connected to the outer race, the fastening portion being cylindrical shaped and extending axially, the fastening portion having a first diameter;
   the can further having a cylindrical portion connected to the fastening portion and having a cylindrical shape and extending axially, the cylindrical portion having a second diameter being smaller than the first diameter of the fastening portion;
   the can further having a tapered portion extending axially and tapered radially inwardly from the cylindrical portion; and
   the can further having a radial portion extending perpendicularly to the axis between the fastening portion and the cylindrical portion, wherein an outer portion of the boot is sandwiched between an end face of the outer race at an axial end of the outer race and the radial portion of the can to secure the outer portion of the boot in place relative to the outer race.

2. The constant velocity joint as set forth in claim 1, wherein the flexible material of the boot has a shore hardness of between approximately Shore 55A and Shore 65A.

3. The constant velocity joint as set forth in claim 1, wherein the boot is sealed relative to the outer race and the second shaft.

4. The constant velocity joint as set forth in claim 1, wherein the boot is crimped to the outer race with the can.

5. The constant velocity joint as set forth in claim 1, wherein the outer race terminates at an end face in a direction of the first axis, and wherein the outer region of the boot overlies the end face of the outer race.

6. The constant velocity joint as set forth in claim 5, wherein the end face extends along a plane being perpendicular to the first axis.

7. The constant velocity joint as set forth in claim 6, wherein the can crimps the outer region of the boot to the outer race along the end face of the outer race, and the can further extends along a radially outer surface of the outer race.

8. The constant velocity joint as set forth in claim 1, wherein the second shaft extends along a second axis and extends to a terminal region in the compartment, and an outer surface of the second shaft defines an annular slot extending radially inwardly and in axially spaced relationship with the terminal region of the second shaft.

9. The constant velocity joint as set forth in claim 8, wherein a clamp is clamped about an inner end of the boot in alignment with the slot of the second shaft for connecting the boot to the second shaft.

10. The constant velocity joint as set forth in claim 1, wherein the first shaft defines a first hollow along the axis, and a first seal is positioned in the first hollow to further define the compartment and sealingly separate the first hollow from the compartment.

11. The constant velocity joint as set forth in claim 1, wherein the outer portion of the boot presents a protrusion, and wherein the end face of the outer race defines a notch receiving the protrusion for further securing the end of the boot in place relative to the outer race.

12. The constant velocity joint as set forth in claim 1, wherein the inner race is formed integrally with the second shaft.

13. The constant velocity joint as set forth in claim 1, wherein the second shaft has an inner surface defining a hollow along the axis, and wherein the inner surface presents a plurality of internal splines configured to interleave with a plurality of external splines of a further shaft received in the hollow.

14. A constant velocity joint, comprising:
   a first shaft extending along and rotatable about a first axis;
   an outer race connected to and rotatable with the first shaft and defining a compartment;
   a second shaft being rotatable;
   an inner race connected to the second shaft in the compartment, the inner race rotatable with the outer race and pivotably connected to the outer race such that the inner race and second shaft are pivotable relative to the outer race;
   a boot comprised of a flexible material and having an outer region connected to the outer race and an inner region connected to the second shaft and configured to seal the region between the outer race and the second shaft; and
   a can overlying the boot for maintaining a shape of the boot along at least a portion of the boot as the boot expands and engages an inner surface of the can;
   wherein the second shaft extends along a second axis and defines a hollow along the second axis, and a seal is positioned in the hollow to further define the compartment and to sealingly separate the hollow from the compartment.

15. The constant velocity joint as set forth in claim 1, wherein the compartment is completely sealed from an environment of the constant velocity joint.

16. The constant velocity joint as set forth in claim 1, wherein an o-ring seal is not located between the boot and the outer race.

17. The constant velocity joint as set forth in claim 14, wherein the inner race is formed integrally with the second shaft.

* * * * *